(12) United States Patent
Hirman

(10) Patent No.: US 10,315,858 B2
(45) Date of Patent: Jun. 11, 2019

(54) MATERIAL DEFLECTOR FOR A GROUND MILLING MACHINE

(71) Applicant: Caterpillar Paving Products Inc., Brooklyn Park, MN (US)

(72) Inventor: Colton Hirman, Maple Grove, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 15/806,916

(22) Filed: Nov. 8, 2017

(65) Prior Publication Data
US 2019/0135553 A1  May 9, 2019

(51) Int. Cl.
| | |
|---|---|
| *E01C 23/08* | (2006.01) |
| *B65G 47/58* | (2006.01) |
| *E01C 23/088* | (2006.01) |
| *E01C 23/12* | (2006.01) |
| *B65G 15/24* | (2006.01) |
| *B65G 67/08* | (2006.01) |
| *B65G 41/00* | (2006.01) |
| *B65G 69/18* | (2006.01) |

(52) U.S. Cl.
CPC ............. *B65G 47/58* (2013.01); *B65G 15/24* (2013.01); *B65G 41/008* (2013.01); *B65G 67/08* (2013.01); *E01C 23/088* (2013.01); *E01C 23/127* (2013.01); *B65G 69/18* (2013.01); *B65G 2201/04* (2013.01)

(58) Field of Classification Search
CPC ...... E01C 23/088; E01C 23/127; B65G 15/24
USPC ................. 198/457.05, 452, 599, 633, 637
See application file for complete search history.

(56) References Cited

U.S. PATENT DOCUMENTS

| | | | | |
|---|---|---|---|---|
| 2,133,396 | A | * 10/1938 | Neal | A01D 61/008 198/599 |
| 2,421,425 | A | * 6/1947 | Leszkowicz | A01D 33/00 171/130 |
| 2,649,185 | A | * 8/1953 | Lichtenberg | E01C 19/185 198/311 |
| 2,988,203 | A | * 6/1961 | Peterson | B65G 33/32 198/579 |
| 3,802,525 | A | * 4/1974 | Snow, Jr. | E01C 19/004 180/9.46 |
| 3,885,332 | A | | 5/1975 | Holland |
| 4,183,158 | A | | 1/1980 | Satterwhite |
| 5,632,370 | A | | 5/1997 | Grathoff |
| 6,848,568 | B1 | | 2/2005 | Nibler |
| 9,186,681 | B2 | | 11/2015 | Cohen |
| 9,273,433 | B2 | | 3/2016 | Musil |
| 2005/0179308 | A1 | * 8/2005 | Gaertner | E01C 23/088 299/39.2 |
| 2014/0084665 | A1 | * 3/2014 | Motz | B65G 37/00 299/39.2 |

(Continued)

*Primary Examiner* — Janine M Kreck
(74) *Attorney, Agent, or Firm* — Bookoff McAndrews

(57) ABSTRACT

A cold planer includes a frame and a conveyor system configured to transport milled material. The conveyor system may include a primary conveyor configured to transfer the milled material to a charge end of a secondary conveyor. The cold planer may also include a material deflector having a deflecting surface angled with respect to a longitudinal axis of the cold planer. The deflecting surface may be configured to deflect at least a portion of the milled material exiting the primary conveyor towards the charge end of the secondary conveyor.

20 Claims, 3 Drawing Sheets

(56) References Cited

U.S. PATENT DOCUMENTS

2015/0176230 A1     6/2015   Berning et al.
2016/0137422 A1     5/2016   Husar et al.
2016/0281305 A1*   9/2016   Hsieh .................... E01C 23/088
2016/0326870 A1   11/2016   Bjorge

* cited by examiner

MATERIAL DEFLECTOR FOR A GROUND MILLING MACHINE

TECHNICAL FIELD

The present disclosure relates generally to a material deflector for a ground milling machine, and more particularly, to a material deflector used in the material transfer apparatus of a cold planer machine.

BACKGROUND

Asphalt-surfaced roadways are built to facilitate vehicular travel. Depending upon usage density, base conditions, temperature variation, moisture variation, and/or physical age, the surface of the roadways eventually become misshapen, non-planar, unable to support wheel loads, or otherwise unsuitable for vehicular traffic. In order to rehabilitate the roadways for continued vehicular use, spent asphalt is removed in preparation for resurfacing.

Cold planers, sometimes also called road mills or scarifiers, are machines that typically include a frame propelled by tracked drive units. The frame supports an engine, an operator's station, and a milling drum. The milling drum, fitted with cutting tools, is rotated through a suitable interface by the engine to break up the surface of the roadway. The broken up roadway material is deposited by the milling drum onto a lower or primary conveyor for removal from the underside of the machine. The material is then transferred from the primary conveyor onto an upper or secondary conveyor, which transports the material away from the machine and over a nearby haul truck. The material travels up the secondary conveyor and falls off the end into the haul truck for transportation away from the jobsite.

An exemplary cold planar having the above-described conveyor system is disclosed in U.S. Patent Application Publication No. 2014/0084665 of Motz et al. In the conveyor system of the '665 publication, the milled material is transferred from the primary to the secondary conveyor free from obstructions without deflection by a material deflection device. While effective in some applications, the conveyor system of the '665 publication may be problematic in other applications. Specifically, there may be situations where the operator desires to transfer the milled material from the primary conveyor to a predetermined region of the secondary conveyor repeatably while minimizing spillage over the sides of the conveyor. The material deflector of the current disclosure may solve one or more of the problems set forth above and/or other problems in the art. The scope of the current disclosure, however, is defined by the attached claims, and not by the ability to solve any specific problem.

SUMMARY

In one aspect, a cold planer is disclosed. The cold planer includes a frame and a conveyor system configured to transport milled material. The conveyor system may include a primary conveyor configured to transfer the milled material to a charge end of a secondary conveyor. The cold planer may also include a material deflector having a deflecting surface angled with respect to a longitudinal axis of the cold planer. The deflecting surface may be configured to deflect at least a portion of the milled material exiting the primary conveyor towards the charge end of the secondary conveyor.

In another aspect, a cold planer is disclosed. The cold planer includes a frame, a milling drum, and a conveyor system configured to transport milled material away from the milling drum. The conveyor system may include a primary conveyor configured to transport milled material from the milling drum to a discharge end of the primary conveyor, and a secondary conveyor configured to receive the milled material from the discharge end at a charge end and transport the received milled material to a downstream end. The cold planer may include a material deflector coupled to the frame. The material deflector may include a deflecting surface facing the discharge end of the primary conveyor. The deflecting surface may make an acute angle with a longitudinal axis of the cold planer and may be configured to deflect at least a portion of the milled material exiting the discharge end of the primary conveyor towards the charge end of the secondary conveyor.

In yet another aspect, a method of operating a cold planer including a conveyor system having a primary conveyor and a secondary conveyor and a material deflector. The method may comprise discharging milled material from a discharge end of the primary conveyor to a charge end of the secondary conveyor. The method may also comprise deflecting, using a deflecting surface of the material deflector, at least a portion of the milled material discharged from the discharge end of the primary conveyor towards the charge end of the secondary conveyor. The defecting surface may face the discharge end of the primary conveyor and make an acute angle with a longitudinal axis of the cold planer.

DETAILED DESCRIPTION

For the purpose of this disclosure, the term "asphalt" may be defined as a mixture of aggregate and asphalt cement. Asphalt cement may be a brownish-black solid or semi-solid mixture of bitumens obtained as a byproduct of petroleum distillation. The asphalt cement may be heated and mixed with the aggregate for use in paving roadway surfaces, where the mixture hardens upon cooling. A "cold planer" may be defined as a machine used to remove layers of hardened asphalt from an existing roadway. It is contemplated that the disclosed cold planer may also or alternatively be used to remove cement and other roadway surfaces. In this disclosure, relative terms, such as, for example, "about" is used to indicate a possible variation of ±10% in a stated numeric value.

Figure 1:
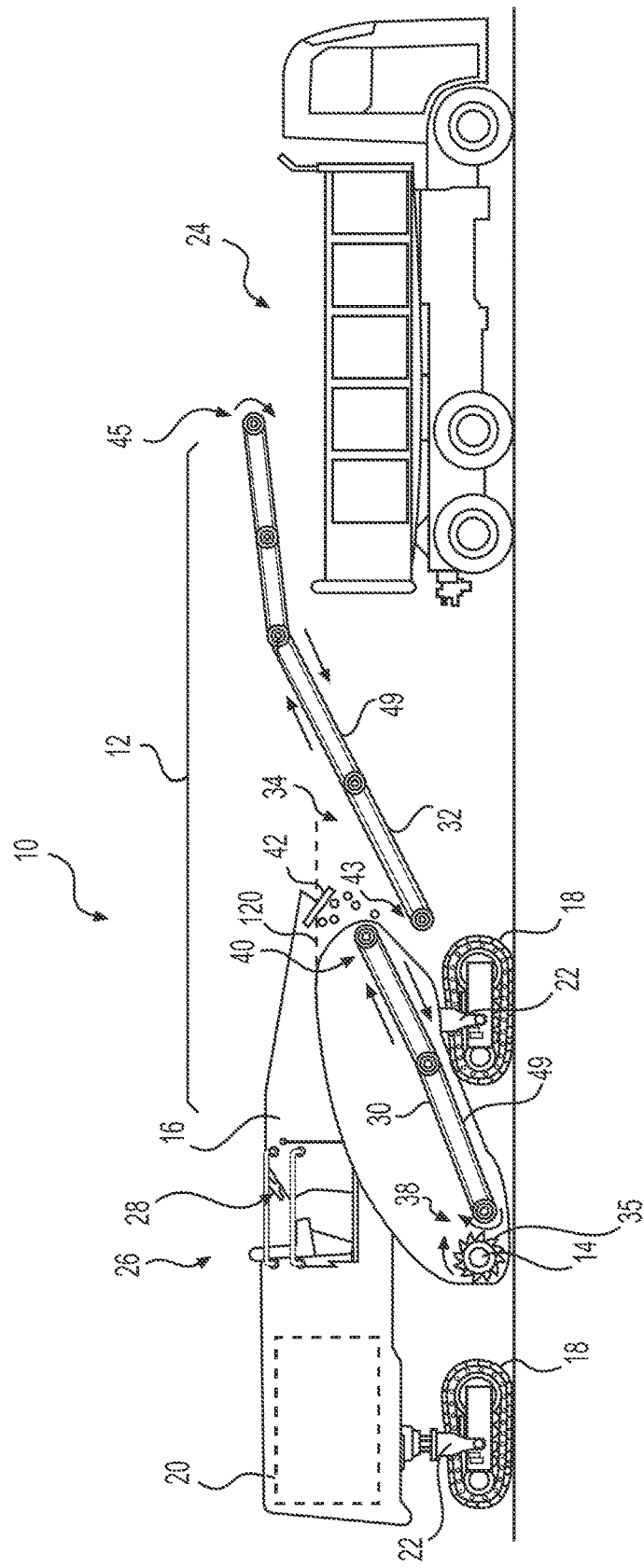
FIG. 1 shows a partial view of an exemplary cold planer having a material transfer system.

FIG. 1 illustrates an exemplary cold planer 10 having a material transfer system or a conveyor system 12 associated with a milling drum 14. Cold planer 10 may include a frame 16 supported by one or more traction devices 18, and a frame-mounted engine 20 configured to drive conveyor system 12, milling drum 14, and traction devices 18. Traction devices 18 may include either wheels or tracks connected to lifting columns 22 that are adapted to controllably raise and lower frame 16 (and milling drum 14) relative to a ground surface. Conveyor system 12 may be connected at a leading end to frame 16 and configured to transport material away from the milling drum 14 and into a waiting haul vehicle 24.

Frame 16 may also support an operator station 26 having one or more input devices 28 used to control the cold planer 10 during operation. For example, using the input devices 28, the operator may control the operations of, among others, the conveyor system 12 (such as, for example, the speed, direction, swivel, etc.) and the milling drum 14 (such as, for example, milling speed, depth of cut, etc.). Conveyor system 12 may include various components that cooperate to transfer broken up (or milled) asphalt from the milling drum 14 to the waiting haul vehicle 24. Specifically, conveyor system 12 may include a primary conveyor 30, a secondary conveyor 32, and a transition region 34 located between the primary conveyor 30 and the secondary conveyor 32. Each of the primary and secondary conveyors 30, 32 may include a belt 49 that is driven to rotate about spaced apart rollers by an associated motor (not shown). The secondary conveyor 32 may discharge the milled asphalt into the haul vehicle 24 from a discharge end 45. In some embodiments, the secondary conveyor 32 may be capable of swiveling side-to-side and moving up-and-down to facilitate the discharge of the milled asphalt into haul vehicles of different sizes and a haul vehicle positioned, for example, towards a side of the cold planer 10. The operator may adjust the swivel, motor speed, etc., of the conveyor system 12 using the input devices 28 to regulate the flow of the milled asphalt to the haul vehicle 24.

Cutting tools 35 connected to an outer periphery of the milling drum 14 may be configured to mill asphalt from the road surface and transfer the milled asphalt onto a charge end 38 of the primary conveyor 30 as the milling drum 14 rotates. The primary conveyor 30 transports the milled asphalt from the charge end 38 to a discharge end 40 (of the primary conveyor 30) positioned in the transition region 34. To prevent (or minimize) the milled material from spilling over the sides of the primary conveyor, in some embodiments, a housing 36 (shown in FIG. 2), attached to the frame 16, may cover at least a portion of the primary conveyor 30. At the discharge end 40, the milled asphalt drops or falls onto the charge end 43 of the secondary conveyor 32 in the transition region 34. In some cases, the speed of the belt 49 may cause the milled asphalt to be ejected from the discharge end 40 of the primary conveyor 30. Some of this ejected asphalt may contact (e.g., strike against) a material deflector 42 positioned in the transition region 34 to deflect the asphalt and redirect it towards the charge end 43 of secondary conveyor 32.

Figure 2:
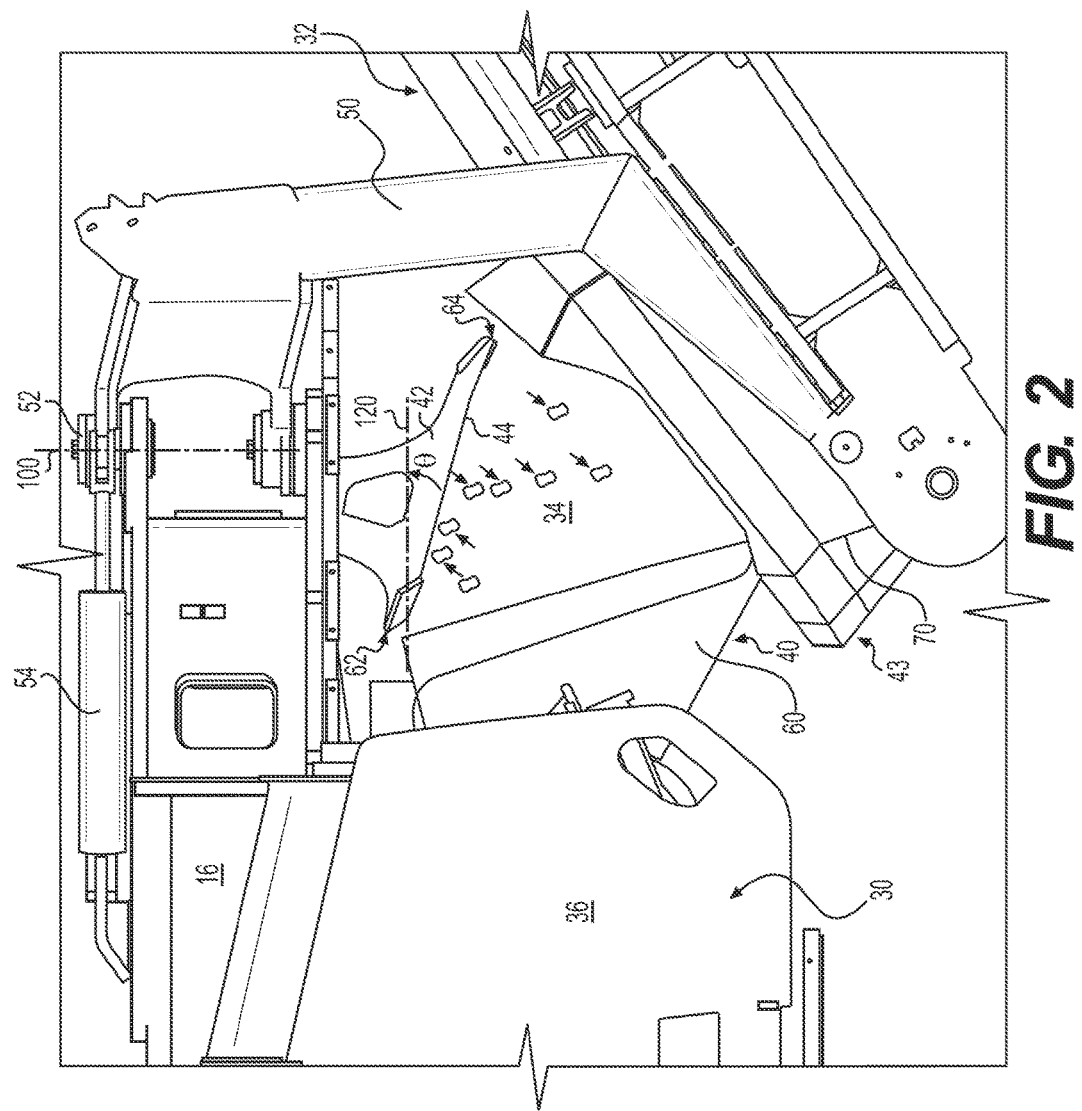
FIG. 2 shows an exemplary material transfer region of the cold planer of FIG. 1 illustrating an exemplary material deflector.

FIG. 2 illustrates an exemplary transition region 34 of the conveyor system 12. As explained previously, the transition region 34 is the region of the conveyor system 12 where the milled material gets transferred from the discharge end 40 of the primary conveyor 30 to the charge end 43 of the secondary conveyor 32. The housing 36, attached to the frame 16 of the cold planer 10, may cover the discharge end 40 of the primary conveyor 30. The charge end 43 of the secondary conveyor 32 may be supported on the frame 16 by a pivot arm 50 coupled to the frame 16 at a pivot 52. A swing cylinder 54, coupled to the frame 16 and the pivot arm 50, may be configured to rotate the pivot arm 50 about a vertical axis 100 (i.e., vertical relative to the ground surface the cold planer 10 is positioned on) at the pivot 52 to swivel the secondary conveyor 32 side-to-side. For example, in response to operator commands (e.g., via input devices 28), the swing cylinder 54 may actuate to rotate the secondary conveyor 32 (at pivot 52) about the vertical axis 100 relative to the primary conveyor 30 to discharge the milled asphalt into a haul vehicle 24 positioned by the side of the cold planer 10.

As illustrated in FIG. 2, the discharge end 40 of the primary conveyor 30 may include a scoop 60 shaped to funnel the milled material from the primary conveyor 30 to the charge end 43 of the secondary conveyor 32. The charge end 43 of the secondary conveyor 32 may include a hopper 70 configured to receive the volume of milled material from the primary conveyor 30 (e.g., without spilling over the sides), and channel it towards the discharge end 45 (of the secondary conveyor 32). In some embodiments, a hood flashing (not shown) may be attached to the frame (e.g., around the material deflector 42) and arranged around a portion of the transition region 34, for example, like a curtain or a drape, to reduce the amount of dust and milled material exiting the transition region 34. The hood flashing may be a flexible component (e.g., plastic sheet) that surrounds the transition region 34 while enabling the secondary conveyor 32 to move (e.g., swivel, etc.) relative to the primary conveyor 30. It should be noted that the scoop 60, hopper 70, and hood flashing are only exemplary and are not requirements. In some embodiments, some or all of these components may be eliminated.

When the speed and/or volume of the milled asphalt in the primary conveyor 30 is relatively low, the milled asphalt exiting the scoop 60 may fall directly on the hopper 70 (e.g., by gravity). However, when the volume and/or the speed of the milled asphalt (in the primary conveyor 30) increases, as illustrated in FIG. 2, some of the milled asphalt may be ejected (e.g., by inertial forces) from the primary conveyor 30 towards the material deflector 42. This ejected asphalt may impact, or strike against, the material deflector 42 and get deflected towards the scoop 60.

The material deflector 42 may be attached to the frame 16 and have a deflecting surface 44 configured (shaped, angled, etc.) to deflect and redirect the milled asphalt exiting the primary conveyor 30 towards the charge end 43 of the secondary conveyor 32. As illustrated in FIG. 2, the deflecting surface 44 may be angled with respect to the vertical axis 100 and a horizontal or longitudinal axis 120 (i.e., horizontal relative to the ground surface the cold planer 10 is positioned on) to deflect the milled asphalt towards the charge end 43. Generally, the deflecting surface 44 may make an acute angle with the longitudinal axis 120 (i.e., angle $\theta < 90°$). In some embodiments, the deflecting surface 44 may make an angle $\theta$ between about 30°-70° with the longitudinal axis 120. In some embodiments, the material deflector 42 may be fixed to the frame 16 such that the deflecting surface 44 makes a constant angle $\theta$ with respect to the longitudinal axis 120. In some embodiments, angle $\theta$ may be adjustable (e.g., by the operator using input devices 28). In some embodiments, the material deflector 42 may be fixed to remain stationary when the secondary conveyor 32 moves (e.g., swivels about pivot 52) relative to the primary conveyor 30. That is, in such embodiments, the material deflector 42 (and the deflecting surface 44) is fixed with respect to the primary conveyor 30. And, in some embodiments, the material deflector 42 may be fixed with respect to the secondary conveyor 32. That is, in such embodiments, the material deflector 42 may move with the secondary conveyor 32 as its swivels about the pivot 52. In some such embodiments, the material deflector 42 may be fixed to the pivot arm 50.

Figure 3:
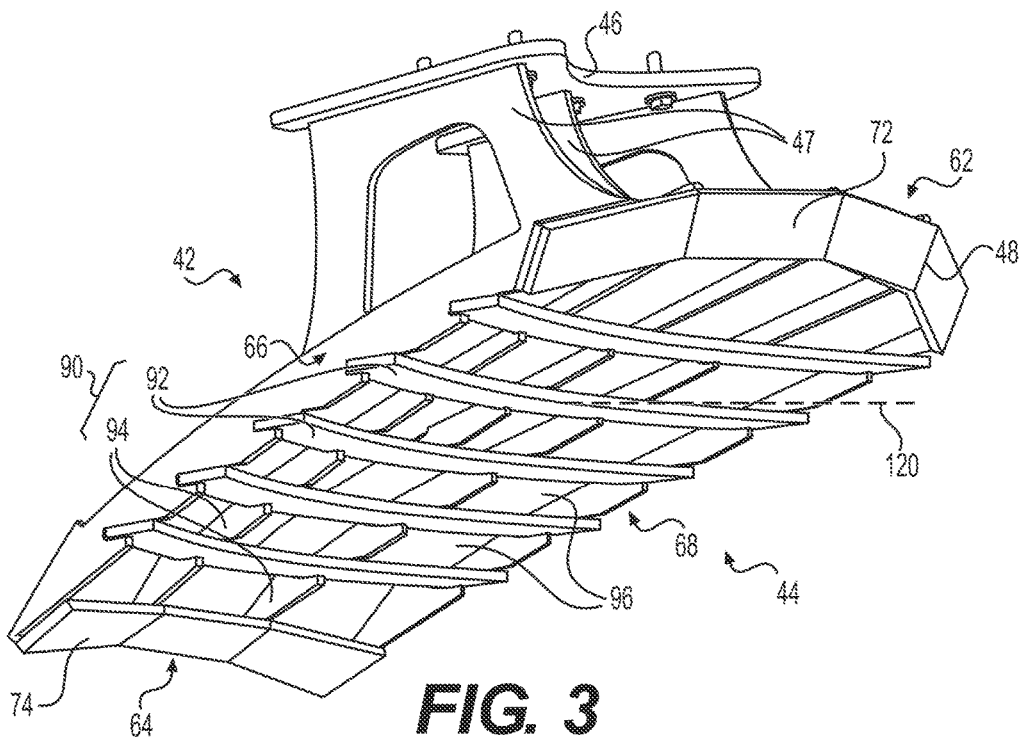
FIG. 3 is a perspective side view of an exemplary material deflector of the machine of FIG. 1.
Figure 4:
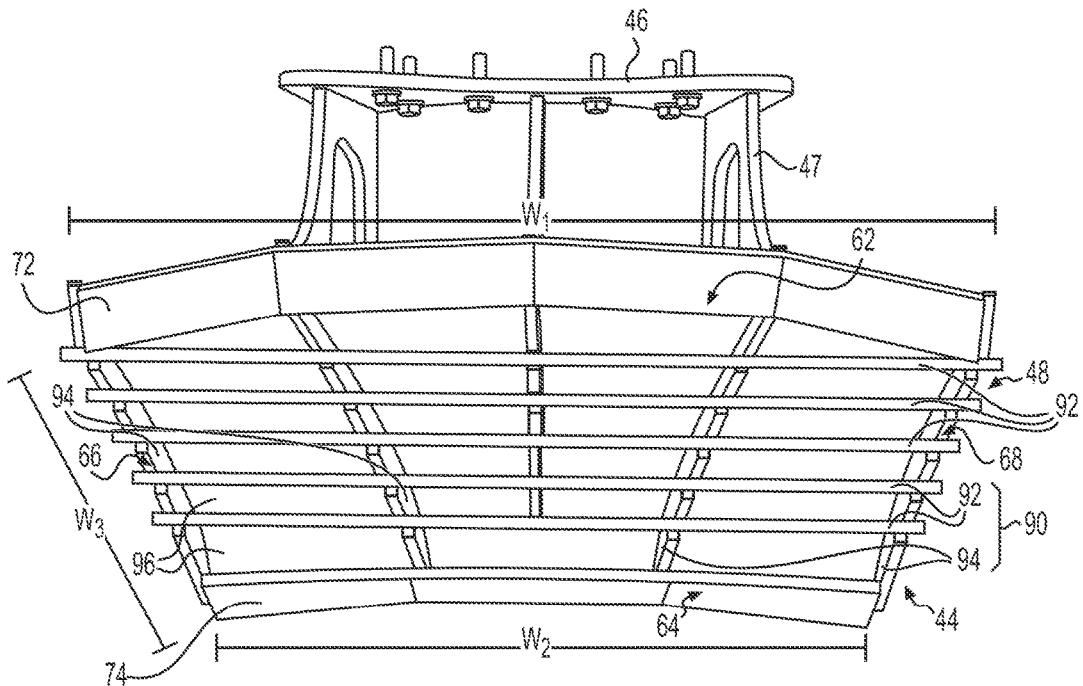
FIG. 4 is a perspective front view of the material deflector of FIG. 3.

The material deflector 42 may be shaped to deflect at least some of the milled asphalt (ejected from the primary conveyor 30) that impacts it towards the charge end 43 of the secondary conveyor 32. FIGS. 3 and 4 illustrate an exemplary material deflector 42 that may be used on the cold planer 10. In the discussion below, reference will be made to both FIGS. 3 and 4. The material deflector 42 may include a base section 46 and a deflecting section 48 attached together via connecting members 47. Although the material deflector 42 is illustrated as having three connecting members 47, this is only exemplary. In general, any number of connecting members 47 (1, 2, 4, etc.) may connect the base section 46 to the deflecting section 48. The base section 46 may include features to facilitate its attachment to the frame 16 of the cold planer 10. In some embodiments, as illustrated in FIGS. 3 and 4, the base section 46 may include fasteners (or holes through which fasteners may be passed) to attach the material deflector 42 to the frame 16.

The deflecting section 48 may be a plate-like component having a surface that forms the deflecting surface 44. The connecting members 47 may be shaped to orient the deflecting surface 44 at angle θ with respect to the longitudinal axis 120 when the base section 46 is attached to the frame 16 (see FIG. 2). In some embodiments, the deflecting section 48 may be a substantially trapezoidal shaped component having a first side 62 and a second side 64 forming opposite parallel sides, and a third side 66 and a fourth side 68 forming opposite sides. When attached to the frame 16, the third side 66 and the fourth side 68 may be aligned along a length direction of the primary conveyor 30 (e.g., at the discharge end 40). In some embodiments, the third side 66 and the fourth side 68 may be aligned along a length direction of the cold planer 10. And, the first side 62 and the second side 64 may be aligned substantially transverse to this length direction. In some embodiments, the width $W_1$ of the first side 62 may be greater than the width $W_2$ of the second side 64. As illustrated in FIGS. 1 and 2, when attached to the frame 16, the material deflector 42 may be oriented such that the wider first side 62 is positioned higher with respect to the ground surface and more proximate the primary conveyor 30 as compared to the narrower second side 64. That is, the wider first side 62 is positioned upstream and the narrower second side 64 is positioned downstream with respect to a direction of material flow in the conveyor system 12.

The values of widths $W_1$ and $W_2$ may depend upon the application (e.g., size, capacity, etc. of the cold planer, etc.). However, in some embodiments, width $W_1$ may be between about 500-1000 inches (i.e., 12700-25400 mm) and width $W_2$ may be between 400-800 inches (10160-20320 mm). Although not a requirement, in some embodiments, the third side 66 and the fourth side 68 may have a substantially equal width $W_3$. In some embodiments, the width of the third side 66 and the fourth side 68 may be between about 600-1000 inches (15240-25400 mm). It should be noted that the above described shape of the deflecting section 48 and the widths of its sides are only exemplary. In general, the deflecting section 48 may have any shape (rectangular, square, etc.) and size.

Although not a requirement, in some embodiments, the deflecting section 48 may be curved. As illustrated in FIGS. 3 and 4, in some embodiments, some or all of the first side 62, second side 64, third side 66, and the fourth side 68 may be curved. In some embodiments, the first side 62 and the second side 64 may have substantially the same curvature and the third side 66 and the fourth side 68 may have substantially the same curvature. In some embodiments, only one pair of opposite sides (i.e., first side 62 and second side 64, or third side 66 and fourth side 68) of the deflecting section 48 may be curved. In some embodiments, the deflecting section 48 may be curved such that the deflecting surface 44 is a substantially concave surface that faces the discharge end 40 of the primary conveyor 30 when the material deflector 42 is attached to the frame 16.

As explained previously, the deflecting surface 44 of the material deflector 42 is configured to deflect the milled asphalt from the primary conveyor 30 towards the charge end 43 of the secondary conveyor 32. In some embodiments, the deflecting surface 44 may include a plate (or multiple plates welded together). Repeated impact of the milled material on the deflecting surface 44 may result in wear (e.g., abrasive wear) of the deflecting surface 44 (and/or other regions of the deflecting section 48). To reduce wear, in some embodiments, the material deflector 42 may be oxidized (e.g., hard oxidized). Any known hard oxidation treatment may be applied on the material deflector 42 to increase its wear resistance. In some embodiments, only the deflecting surface 44 of the deflecting section 48 may be oxidized. In some embodiments, other surfaces of the material deflector 42 may also be oxidized.

Alternatively or additionally, in some embodiments, the deflecting section 48 may have other features configured to reduce wear. For example, in some embodiments, the deflecting surface 44 may be textured or contoured to capture and retain (e.g., wedge, lodge, adhere, embed, etc.) some of the milled material impinging thereon. That is, some of the impinging milled material may get attached (or stuck) on the deflecting surface 44. Over time, this captured milled material may form a sacrificial layer on the deflecting surface 44 that serves as a contact surface for the subsequently impinging milled material. Since this sacrificial layer bears the brunt of the impact of the impinging milled material, wear damage on the deflecting surface 44 may be reduced. During operation of the cold planer, some of the milled material in the sacrificial layer may get dislodged (or broken by the force of impact from impinging milled material) and replaced by subsequently impinging milled material. Thus, during operation of the cold planer 10, after a layer of sacrificial milled material is initially formed, it may be automatically replenished.

The deflecting surface 44 may have any type of texture/contour that promotes the capture of the impinging milled material. In some embodiments, the deflecting surface 44 may include pockets or cavities which serve to lodge impinging milled material therein. In some embodiments, the pockets may include an array of depressions (e.g., like a muffin pan) formed on the deflecting surface 44 to capture impinging milled material therein. These depressions may have any size and shape. In some embodiments, components, such as stringers 90 of FIGS. 3 and 4, may be coupled to the deflecting section 48 to define pockets on the deflecting surface 44. These stringers 90 may include first stringers 92 and second stringers 94 which intersect to form pockets 96 therebetween. Although not a requirement, in some embodiments, the first stringers 92 and the second stringers 94 may intersect to form substantially rectangular-shaped (or square-shaped) pockets 96 on the deflecting surface 44. In some embodiments, the first stringers 92 may be arranged substantially parallel to the first side 62 and/or the second side 64, and second stringers 94 may be arranged substantially transverse to the first stringers 92.

Any number of first and second stingers 92, 94 may be attached to the deflecting section 48 to form pockets 96. Although FIGS. 3 and 4 illustrate five first stringers 92 and four second stringers 94, this is only exemplary. In general, the size of the pockets 96 depend on the number of first and second stringers 92, 94 used and the spacing between them. The spacing between the first and second stringers 92, 94

(and the size of the pockets 96) may be substantially uniform, or may vary, across the deflecting surface 44. In some embodiments, some of the pockets 96 may have a width (e.g., along the direction of first side 62) of between about 100-200 mm (3.94-7.87 inches), a length (e.g., along a direction transverse to the first side 62) of between about 50-100 mm (1.97-3.94 inches), and a depth (e.g., towards the deflecting surface 44) of between about 10-50 mm (0.39-1.97 inches).

The stringers 90 may be attached to the deflecting section 48 by any method. In some embodiments, the stringers 90 may be welded to the deflecting section 48. In some embodiments, one end of each first stringer 92 may be attached (e.g., welded) to the third side 66 of the deflecting surface 44 and its opposite end attached (e.g., welded) to the fourth side 68. Similarly, opposite ends of each second stringer 94 may be attached to the first and second sides 62 and 64, respectively. The first and second stringers 92, 94 may also be attached to each other at intersecting locations. In some embodiments, some or all the sides of the deflecting surface 44 may have slots, grooves, or channels formed thereon to fit the opposite ends of the stringers 90 therein (for example, like louvres). For example, as illustrated in FIG. 3, the third side 66 and the fourth side 68 may have slots that receive the opposite ends of each first stringer 92. Similarly, in some embodiments, slots may also be formed on the first and second side 62, 64 to receive the opposite ends of each second stringer 94. As illustrated in FIG. 3, in some embodiments, slots may also be formed on the second stringer 94 (or the first stringer 92) to receive the first stringer 92 (or the second stringer 94) at their intersecting locations. In some embodiments, the stringers 90 may be welded to the deflecting surface 44 at multiple regions to increase its strength, rigidity, and/or stability. In some embodiments, angled plates (or front and rear bumpers 72, 74) may be attached to the first and second sides 62, 64 of the deflecting surface 44. In use, these bumpers 72, 74 may provide additional stability to the stringers 90.

In some embodiments, the first and second stringers 92, 94 may be elongated bars (or rods) having any size and cross-sectional shape (round, rectangular, square, etc.). In general, the first and second stringers 92, 94 may be arranged such that the pockets 96 formed between these stringers are well suited to receive the milled material ejected from the primary conveyor 30. For example, the stringers 90 may be arranged such that they do not substantially block the entry of milled material into the pockets 96. In some embodiments, as illustrated in FIG. 3, at least the first stringers 92 may have a rectangular cross-sectional shape, and slots formed on the third and fourth sides 66, 68 (or the deflecting surface 44) may be such that the first stringers 92 are oriented with their longer width dimension substantially horizontal to the ground surface (i.e., substantially parallel to the longitudinal axis 120). However, this is only exemplary, and the width dimension of the first stringer 92 may make any angle with the ground surface.

INDUSTRIAL APPLICABILITY

The disclosed material deflector 42 may be used in any ground milling machine where controlled transportation of the milled material is important. The disclosed material deflector 42 may include a plate-like deflecting section 48 angled to deflect milled material ejected from the primary conveyor towards a desired region of the secondary conveyor. In some embodiments, the material deflector may be configured to reduce wear due the repeated impact of the milled material thereon. Operation of cold planer 10 with the disclosed material deflector 42 will now be explained.

During operation of the cold planer 10, the milling drum 14 may break up and remove a portion of the ground surface and load the removed milled material on the conveyor system 12. This milled material is transported to a waiting haul vehicle 24 on the conveyor system 12. The conveyor system 12 includes a primary conveyor 30 that transfers the milled material to a secondary conveyor 32 at a transition region 34. When the milled material exits the primary conveyor 30, some of the milled material may impinge on, and get deflected by, the material deflector 42 towards the charge region of the secondary conveyor 32. The material deflector 42 is positioned (e.g., angled) such that its deflecting surface 44 deflects the impinging milled material towards the secondary conveyor 32. In some embodiments, the deflecting surface 44 includes features configured to capture some of the milled material impinging thereon. Over time, this captured milled material forms a sacrificial surface layer that acts an impact surface for the subsequently impinging milled material.

The use of an angled material deflector 42 to deflect the milled material from the primary conveyor towards the secondary conveyor allows the milled material to be directed to a desired region of the secondary conveyor. The size, shape, and angular orientation of the deflecting section 48 (or the material deflector 42) may be such that the milled material is repeatably deflected to the desired region even when the secondary conveyor 32 is in a swiveled configuration (i.e., when the secondary conveyor 32 is swiveled to one side). Forming a sacrificial layer (of milled material) on the material deflector 42 to act as an impact surface reduces wear damage of the material deflector 42 and prolongs the life of the material deflector 42.

It will be apparent to those skilled in the art that various modifications and variations can be made to the disclosed system without departing from the scope of the disclosure. Other embodiments of the system will be apparent to those skilled in the art from consideration of the specification and practice of the material deflector disclosed herein. It is intended that the specification and examples be considered as exemplary only, with a true scope of the disclosure being indicated by the following claims and their equivalents.

What is claimed is:

1. A cold planer, comprising:
   a frame;
   a conveyor system configured to transport milled material, wherein the conveyor system includes a primary conveyor configured to transfer the milled material to a charge end of a secondary conveyor; and
   a material deflector having a deflecting surface angled with respect to a longitudinal axis of the cold planer, the deflecting surface being configured to deflect at least a portion of the milled material exiting the primary conveyor towards the charge end of the secondary conveyor, wherein the deflecting surface includes a plurality of pockets.

2. The cold planer of claim 1, wherein the deflecting surface makes an acute angle with the longitudinal axis.

3. The cold planer of claim 1, wherein the deflecting surface makes an angle between about 30-70 degrees with the longitudinal axis.

4. The cold planer of claim 1, wherein the material deflector is fixed with respect to the primary conveyor.

5. The cold planer of claim 1, wherein the deflecting surface includes a substantially concave surface facing a discharge end of the primary conveyor.

6. The cold planer of claim 1, wherein the deflecting surface is wider at a top end and narrower at a bottom end.

7. The cold planer of claim 1, wherein the plurality of pockets are oriented towards a discharge end of the primary conveyor.

8. The cold planer of claim 7, wherein at least some of the plurality of pockets are substantially rectangular shaped.

9. The cold planer of claim 7, wherein the material deflector includes a plurality of first stringers and a plurality of second stringers arranged substantially transverse to the plurality of first stringers, the plurality of first and second stringers being positioned in front of the deflecting surface, and wherein the plurality of pockets are formed between the plurality of first stringers and the plurality of second stringers.

10. The cold planer of claim 1, wherein the secondary conveyor is configured to swivel about a pivot point and the material deflector is configured to be stationary when the secondary conveyor swivels.

11. A cold planer, comprising:
a frame;
a milling drum; and
a conveyor system configured to transport milled material away from the milling drum, the conveyor system including:
a primary conveyor configured to transport the milled material from the milling drum to a discharge end of the primary conveyor; and
a secondary conveyor configured to receive the milled material from the discharge end at a charge end and transport the received milled material to a downstream end; and
a material deflector coupled to the frame, the material deflector including a deflecting surface facing the discharge end of the primary conveyor, wherein the deflecting surface makes an acute angle with a longitudinal axis of the cold planer and is configured to deflect at least a portion of the milled material exiting the discharge end of the primary conveyor towards the charge end of the secondary conveyor, wherein the deflecting surface includes a plurality of pockets.

12. The cold planer of claim 11, wherein the deflecting surface makes an angle between about 30-70 degrees with the longitudinal axis.

13. The cold planer of claim 11, wherein the deflecting surface includes one or more curved sides, a wider upstream end, and a narrower downstream end.

14. The cold planer of claim 11, wherein the deflecting surface includes a substantially concave surface facing the discharge end of the primary conveyor.

15. The cold planer of claim 11, wherein the material deflector includes a plurality of substantially horizontally-aligned first stringers and a plurality of substantially vertically-aligned second stringers positioned in front of the deflecting surface, and wherein the plurality of pockets are formed between the first stringers and the second stringers.

16. The cold planer of claim 15, wherein the material deflector includes a plurality of slots arranged to receive opposite ends of each first stringer of the plurality of first stringers.

17. A method of operating a cold planer including (a) a conveyor system having a primary conveyor and a secondary conveyor and (b) a material deflector, comprising:
discharging milled material from a discharge end of the primary conveyor to a charge end of the secondary conveyor; and
deflecting, using a deflecting surface of the material deflector, at least a portion of the milled material discharged from the discharge end of the primary conveyor towards the charge end of the secondary conveyor, wherein the defecting surface faces the discharge end of the primary conveyor and makes an acute angle with a longitudinal axis of the cold planer, wherein deflecting at least a portion of the milled material includes retaining at least a portion of the milled material on the deflecting surface to form a sacrificial layer comprising the retained milled material.

18. The method of claim 17, wherein deflecting at least a portion of the milled material includes deflecting the milled material using the sacrificial layer.

19. The method of claim 17, wherein the deflecting surface includes one or more curved sides, a wider upstream end, and a narrower downstream end.

20. The method of claim 17, wherein the deflecting surface includes a substantially concave surface facing the discharge end of the primary conveyor.

* * * * *